United States Patent
Hu et al.

(10) Patent No.: US 12,195,663 B2
(45) Date of Patent: Jan. 14, 2025

(54) EFFICIENT BIODEGRADABLE DUST SUPPRESSANT FOR OPEN-PIT MINE AND PREPARATION METHOD THEREFOR

(71) Applicant: Shandong University of Science and Technology, Qingdao (CN)

(72) Inventors: Xiangming Hu, Qingdao (CN); Xiaoxiao Yu, Qingdao (CN); Yanyun Zhao, Qingdao (CN); Yue Feng, Qingdao (CN); Mingyue Wu, Qingdao (CN); Di Xue, Qingdao (CN); Qian Zhang, Qingdao (CN); Ning Yang, Qingdao (CN); Jianfeng Wei, Qingdao (CN); Jindi Liu, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 0 days.

(21) Appl. No.: 18/430,716

(22) Filed: Feb. 2, 2024

(65) Prior Publication Data
US 2024/0228850 A1 Jul. 11, 2024

(30) Foreign Application Priority Data
Dec. 8, 2022 (CN) .......................... 202211572570.9

(51) Int. Cl.
*C09K 3/22* (2006.01)
(52) U.S. Cl.
CPC ....................................... *C09K 3/22* (2013.01)
(58) Field of Classification Search
CPC .................. C09K 3/22; B01J 2/28; B01J 2/30
USPC ....................................................... 252/88.1
See application file for complete search history.

(56) References Cited

U.S. PATENT DOCUMENTS

| | | | |
|---|---|---|---|
| 2005/0287103 A1* | 12/2005 | Filippi | A61K 8/375 424/70.22 |
| 2008/0230744 A1* | 9/2008 | Hiramoto | B01J 20/22 252/188.28 |
| 2015/0258237 A1* | 9/2015 | Machida | C09K 3/22 252/194 |

FOREIGN PATENT DOCUMENTS

| | | | | |
|---|---|---|---|---|
| CN | 106367028 A | | 2/2017 | |
| CN | 108192569 A | | 6/2018 | |
| CN | 108192570 A | * | 6/2018 | ............... C09K 3/22 |
| CN | 109628066 A | * | 4/2019 | ............... C09K 3/22 |
| CN | 110467907 A | | 11/2019 | |
| CN | 113046027 A | | 6/2021 | |
| CN | 114381235 A | | 4/2022 | |
| JP | 09066277 A | * | 3/1997 | |

OTHER PUBLICATIONS

Yu et al. ("Synthesis and performance characterization of a road coal dust suppressant with excellent consolidation, adhesion, and weather resistance", Colloids and Surfaces A: Physiochemical and Engineering Aspects, vol. 639, Jan. 21, 2022) (Year: 2022).*

Xiaoxiao Yu et al., Synthesis and performance characterization of a road coal dust suppressant with excellent consolidation, adhesion, and weather resistance, Colloids and Surfaces A: Physicochemical and Engineering Aspects, vol. 639, Jan. 21, 2022.

* cited by examiner

Primary Examiner — Matthew R Diaz

(57) ABSTRACT

The present disclosure relates to an efficient biodegradable dust suppressant for an open-pit mine and a preparation method therefor. The dust suppressant includes the following components in percentage by weight: 2%-3.5% of gallic acid, 1.5%-2% of sodium alginate, 0.25%-2% of a surfactant, 0.5%-1% of an antifreeze liquid, and balance water. The preparation method includes the following steps: (1) preparing the gallic acid; (2) preparing the antifreeze liquid; (3) weighing the components in parts by weight; (4) mixing the gallic acid, water, sodium alginate and antifreeze liquid; (5) adding the surfactant; and (6) adding the balance water to prepare the efficient biodegradable dust suppressant for an open-pit mine. The present disclosure has the characteristics of low temperature resistance, high temperature resistance, bonding, wetting, coal dust consolidation and the like, is biodegradable, and does not cause secondary pollution. Meanwhile, the present disclosure causes no harm to human body and the environment.

7 Claims, No Drawings

EFFICIENT BIODEGRADABLE DUST SUPPRESSANT FOR OPEN-PIT MINE AND PREPARATION METHOD THEREFOR

TECHNICAL FIELD

The present disclosure relates to an efficient biodegradable dust suppressant for an open-pit mine and a preparation method therefor, and belongs to the technical field of coal dust prevention and treatment.

BACKGROUND

In recent years, a great amount of coal dust has been generated in the processes of mining, storing, transporting and the like at an open-pit coal mine. Besides, the problems of occupational health, environmental pollution, life safety, property loss and the like caused by the coal dust are concerned. Research shows that surface layer solidification is regarded as an effective method for treating coal dust in order to reduce and prevent the harm of the coal dust. Therefore, the development and use of a coal dust suppressant become effective measures for solving the coal dust pollution. Various dust suppressants are researched and developed at home and abroad, and are widely used, including halides, starches, tar asphalts, and acrylate copolymers. These suppressants play an important role in suppressing coal dust and ensuring safe production of coal mines, but they also have the following problems: the halide dust suppressants ($MgCl_2$ and $CaCl_2$) are inexpensive, but have unsatisfactory adhesion, strong corrosivity and long solidification time; the starch dust suppressant solutions have high viscosity and are difficult to spray; the tar asphalt dust suppressants generally need the addition of an emulsifier, are unstable after emulsification, have a short storage period and are seriously harmful; and the acrylate copolymer dust suppressants are not suitable for popularization and use due to high price.

Therefore, the existing dust suppression materials for an open-pit mine have varying degrees of defects. In order to prevent and treat coal dust, reduce resource waste, protect the environment, and meet the weather adaptability of a solidified layer, there is an urgent need to develop a new dust suppression material for an open-pit mine, and search for more effective dust suppression materials and technologies by jumping out of the existing theory and technical framework, so as to meet the requirements of field actual use.

SUMMARY

Aiming at the above problems, the present disclosure provides an efficient biodegradable dust suppressant for an open-pit mine and a preparation method therefor.

The technical scheme of the present disclosure is as follows.

An efficient biodegradable dust suppressant for an open-pit mine, including the following components in percentage by weight:

2%-3.5% of gallic acid, 1.5%-2% of sodium alginate, 0.25%-2% of a surfactant, 0.5%-1% of an antifreeze liquid, and balance water.

The antifreeze liquid is prepared by reacting formic acid with potassium carbonate, or potassium hydroxide with carbon monoxide in water under heating and pressurizing. The obtained antifreeze liquid is colorless, transparent and odorless, and can significantly reduce the freezing point of the dust suppressant.

Preferably, the gallic acid is obtained by supercritical extraction from a pomegranate peel.

Preferably, the surfactant is a nonionic surfactant or a cationic surfactant, or an anionic surfactant.

Further, the present disclosure provides a method for preparing the efficient biodegradable dust suppressant for an open-pit mine, including the following steps:

(1) extracting the gallic acid from a pomegranate peel by supercritical extraction: using methanol or ethanol as an entrainer and performing the extraction at an extraction pressure of 25-40 MPa, an extraction temperature of 45-57° C., a $CO_2$ flow rate of 9-12 L·h$^{-1}$, a separation pressure of 4.5-5 MPa, and a separation temperature of 45-60° C. for 1-3 h;

(2) preparing the antifreeze liquid by reacting formic acid with potassium carbonate, or potassium hydroxide with carbon monoxide in water under heating and pressurizing;

(3) weighing the components in parts by weight;

(4) placing the extracted gallic acid in deionized water with the pH approximately equal to 8.5, adding the sodium alginate after the gallic acid is completely dissolved, magnetically stirring the same until the sodium alginate is uniformly dissolved, then adding the antifreeze liquid, and fully stirring the same at a rotating speed of 50-80 r/min for 30-40 min at 40-50° C.;

(5) adding the surfactant into the solution and fully stirring the same at a rotating speed of 150-200 r/min for 40-50 min;

(6) after adding the balance water, fully stirring the same at a rotating speed of 150-250 r/min for 30-50 min to obtain the efficient biodegradable dust suppressant for an open-pit mine.

Preferably, in step (1), the methanol is used as an entrainer and the extraction is performed at an extraction pressure of 30 MPa, an extraction temperature of 45° C., a $CO_2$ flow rate of 10 L·h$^{-1}$, a separation pressure of 4.5 MPa, and a separation temperature of 45° C. for 1 h.

Preferably, in step (2), under a working pressure of 0.9-1.5 MPa and a temperature of 150-170° C., the antifreeze liquid is obtained by reacting potassium hydroxide and CO gas with the purity of 90% or more in water, and settling and heating the same for crystallization or concentration.

Preferably, in step (4), the full stirring is performed at a rotating speed of 70 r/min for 40 min at 45° C.

Preferably, in step (5), the full stirring is performed at a rotating speed of 180 r/min for 45 min.

Preferably, in step (6), the full stirring is performed at a rotating speed of 200 r/min for 40 min.

The advantages of the efficient biodegradable dust suppressant for an open-pit mine are mainly as follows:

(1) The gallic acid introduced in the present disclosure has the capability of adhering and consolidating coal dust, increases the consolidation strength of the dust suppressant, effectively solves the problems of secondary dust raising and the like caused by easy cracking of a consolidated layer after consolidation by the traditional dust suppressant, and has satisfactory effects on settling and consolidating dust.

(2) The sodium alginate introduced in the present disclosure has satisfactory water absorption and retention performance, can effectively prevent dust pollution of a protected surface as an important component of the dust suppressant, can form a dynamic hydrogen bond with the gallic acid to further improve the water retention of the dust suppressant, and is beneficial to the preservation of water in high-temperature environment in the summer. In addition, as a macromolecular organic matter, the sodium alginate will not cause secondary pollution to the protected surface after spraying.
(3) The antifreeze liquid added in the present disclosure has the important function of lowering the freezing point of the dust suppressant, such that the product can be applied to the pavement of an open-pit mine in a low-temperature environment in winter, reducing the secondary dust raising of the pavement. Besides, the antifreeze liquids are simple to prepare, safe and pollution-free compared with other antifreeze liquids.
(4) The present disclosure makes full use of the cheap material of a pomegranate peel (waste of fruit factories) to extract the gallic acid, has a low production cost, is suitable for industrial amplification production, and has a wide application prospect.

Compared with the existing technology, the present disclosure has the following advantages:

The efficient biodegradable dust suppressant for an open-pit mine has the functions of low temperature resistance, high temperature resistance, bonding, wetting, coal dust consolidation and the like, is biodegradable, and does not cause secondary pollution. In addition, the consolidated layer is stable, and no secondary dust raising occurs. Compared with the traditional dust suppressant, the dust suppressant of the present disclosure has a simple preparation process and low cost, is harmless to the human body and the environment, and has a wide range of applications and a wide application prospect.

DETAILED DESCRIPTION

The present disclosure will be further described below in conjunction with specific examples, and the advantages and features of the present disclosure will become clearer from the description. However, the examples are only illustrative and do not constitute any limitation to the scope of the present disclosure. Those skilled in the art should appreciate that modifications or substitutions to the details and forms of the technical schemes of the present disclosure can be made without departing from the scope of the present disclosure, but these modifications and substitutions fall within the protection scope of the present disclosure.

Example 1: Efficient Biodegradable Dust Suppressant for Open-Pit Mine and Preparation Method Therefor A dust suppressant included the following components in percentage by weight:

2% of gallic acid, 2% of sodium alginate, 2% of sodium dodecyl sulfate as a surfactant, 1% of an antifreeze liquid, and balance water.

A method for preparing the dust suppressant included the following specific steps:
(1) the gallic acid was extracted from a pomegranate peel by supercritical extraction: methanol was used as an entrainer and the extraction was performed at an extraction pressure of 30 MPa, an extraction temperature of 45° C., a $CO_2$ flow rate of 10 $L·h^{-1}$, a separation pressure of 4.5 MPa, and a separation temperature of 45° C. for 1 h;
(2) the antifreeze liquid was prepared by reacting formic acid with potassium carbonate, where the antifreeze liquid has a relative density of 1.4;
(3) the components were weighed in parts by weight;
(4) the extracted gallic acid was placed in deionized water, the sodium alginate was added after the gallic acid was completely dissolved, the solution was magnetically stirred until the sodium alginate was uniformly dissolved, then the antifreeze liquid was added, and the solution was fully stirred at a rotating speed of 50 r/min for 30 min at 40° C.;
(5) the sodium dodecyl sulfate as a surfactant was added into the solution and the solution was fully stirred at a rotating speed of 150 r/min for 40 min;
(6) after the balance water was added, the solution was fully stirred at a rotating speed of 150 r/min for 30 min to obtain the efficient biodegradable dust suppressant for an open-pit mine.

Example 2: Efficient Biodegradable Dust Suppressant for Open-Pit Mine and Preparation Method Therefor A dust suppressant included the following components in percentage by weight:

2.5% of gallic acid, 1.7% of sodium alginate, 1% of fatty acid esters of polyoxyethylene as a surfactant, 1% of an antifreeze liquid, and balance water.

A method for preparing the dust suppressant included the following specific steps:
(1) the gallic acid was extracted from a pomegranate peel by supercritical extraction: ethanol was used as an entrainer and the extraction was performed at an extraction pressure of 40 MPa, an extraction temperature of 50° C., a $CO_2$ flow rate of 11 $L·h^{-1}$, a separation pressure of 5 MPa, and a separation temperature of 55° C. for 2 h;
(2) the antifreeze liquid was prepared by reacting formic acid with potassium carbonate, where the antifreeze liquid has a relative density of 1.5;
(3) the components were weighed in parts by weight;
(4) the extracted gallic acid was placed in deionized water, the sodium alginate was added after the gallic acid was completely dissolved, the solution was magnetically stirred until the sodium alginate was uniformly dissolved, then the antifreeze liquid was added, and the solution was fully stirred at a rotating speed of 50 r/min for 40 min at 50° C.;
(5) the fatty acid esters of polyoxyethylene as a surfactant was added into the solution and the solution was fully stirred at a rotating speed of 200 r/min for 50 min;
(6) after the balance water was added, the solution was fully stirred at a rotating speed of 250 r/min for 50 min to obtain the efficient biodegradable dust suppressant for an open-pit mine.

Example 3: Efficient Biodegradable Dust Suppressant for Open-Pit Mine and Preparation Method Therefor A dust suppressant included the following components in percentage by weight:

3% of gallic acid, 1.5% of sodium alginate, 0.5% of hexadecyl trimethyl quaternary ammonium bromide as a surfactant, 0.5% of an antifreeze liquid, and balance water.

A method for preparing the dust suppressant included the following specific steps:
(1) the gallic acid was extracted from a pomegranate peel by supercritical extraction: methanol was used as an entrainer and the extraction was performed at an extraction pressure of 25 MPa, an extraction temperature of 55° C., a $CO_2$ flow rate of 12 $L·h^{-1}$, a separation pressure of 4.5 MPa, and a separation temperature of 45° C. for 2 h;

(2) under a working pressure of 0.9-1.5 MPa and a temperature of 150-170° C., the antifreeze liquid was prepared by reacting potassium hydroxide and CO gas with the purity of 90% or more in water, and the same was subjected to settling and heating for crystallization or concentration;

(3) the components were weighed in parts by weight;

(4) the extracted gallic acid was placed in deionized water, the sodium alginate was added after the gallic acid was completely dissolved, the solution was magnetically stirred until the sodium alginate was uniformly dissolved, then the antifreeze liquid was added, and the solution was fully stirred at a rotating speed of 70 r/min for 40 min at 40° C.;

(5) the hexadecyl trimethyl quaternary ammonium bromide as a surfactant was added into the solution and the solution was fully stirred at a rotating speed of 180 r/min for 45 min; and (6) after the balance water was added, the solution was fully stirred at a rotating speed of 200 r/min for 40 min to obtain the efficient biodegradable dust suppressant for an open-pit mine.

The dust suppressant prepared in the present disclosure can be diluted by 9-10 times with water according to the climate and humidity of an open-pit mine, and sprayed on a coal pile or an unpaved road for use. The dust suppressant can adhere to raise dust and then consolidate on the ground, thereby effectively suppressing the raise dust in the production process of building construction, coal transportation, dust workshops and the like. The biodegradation time of the dust suppressant in the environment is 50-70 days.

The dust suppressant of the present disclosure can be diluted for use, has a freezing point of −20° C. or below, a viscosity of 50 MPa. At 25° C., a compressive strength of a consolidated layer of 180 KPa, a water retention time of 60 hours, and a dust suppression efficiency up to 99.7%.

What is claimed is:

1. An efficient biodegradable dust suppressant for an open-pit mine, comprising the following components in percentage by weight:

2%-3.5% of gallic acid, 1.5%-2% of sodium alginate, 0.25%-2% of a surfactant, 0.5%-1% of an antifreeze liquid, and balance water; and a method for preparing the efficient biodegradable dust suppressant for an open-pit mine, comprising the following steps:

(1) extracting the gallic acid from a pomegranate peel by supercritical extraction: using methanol or ethanol as an entrainer and performing the extraction at an extraction pressure of 25-40 MPa, an extraction temperature of 45-57° C., a $CO_2$ flow rate of 9-12 L·h-1, a separation pressure of 4.5-5 MPa, and a separation temperature of 45-60° C. for 1-3 h;

(2) preparing the antifreeze liquid by reacting formic acid with potassium carbonate, or potassium hydroxide with carbon monoxide in water under heating and pressurizing;

(3) weighing the components in parts by weight;

(4) placing the extracted gallic acid in deionized water with the pH approximately equal to 8.5, adding the sodium alginate after the gallic acid is completely dissolved, magnetically stirring the same until the sodium alginate is uniformly dissolved, then adding the antifreeze liquid, and fully stirring the same at a rotating speed of 50-80 r/min for 30-40 min at 40-50° C.;

(5) adding the surfactant into the solution and fully stirring the same at a rotating speed of 150-200 r/min for 40-50 min;

(6) after adding the balance water, fully stirring the same at a rotating speed of 150-250 r/min for 30-50 min to obtain the efficient biodegradable dust suppressant for an open-pit mine.

2. The efficient biodegradable dust suppressant for an open-pit mine of claim 1, wherein the surfactant is a nonionic surfactant or a cationic surfactant, or an anionic surfactant.

3. The efficient biodegradable dust suppressant for an open-pit mine of claim 1, wherein in step (1), the methanol is used as an entrainer and the extraction is performed at an extraction pressure of 30 MPa, an extraction temperature of 45° C., a $CO_2$ flow rate of 10 L·h-1, a separation pressure of 4.5 MPa, and a separation temperature of 45° C. for 1 h.

4. The efficient biodegradable dust suppressant for an open-pit mine of claim 1, wherein in step (2), under a working pressure of 0.9-1.5 MPa and a temperature of 150-170° C., the antifreeze liquid is obtained by reacting potassium hydroxide and CO gas with the purity of 90% or more in water, and settling and heating same for crystallization or concentration.

5. The efficient biodegradable dust suppressant for an open-pit mine of claim 1, wherein in step (4), the full stirring is performed at a rotating speed of 70 r/min for 40 min at 45° C.

6. The efficient biodegradable dust suppressant for an open-pit mine of claim 1, wherein in step (5), the full stirring is performed at a rotating speed of 180 r/min for 45 min.

7. The efficient biodegradable dust suppressant for an open-pit mine of claim 1, wherein in step (6), the full stirring is performed at a rotating speed of 200 r/min for 40 min.

* * * * *